United States Patent
Winters et al.

(10) Patent No.: US 10,402,256 B2
(45) Date of Patent: Sep. 3, 2019

(54) SYSTEMS AND METHODS FOR MICRO-BATCH PROCESSING OF DATA

(71) Applicant: GOPRO, INC., San Mateo, CA (US)

(72) Inventors: David Winters, San Mateo, CA (US); Vijay Velayutham, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 611 days.

(21) Appl. No.: 15/145,715

(22) Filed: May 3, 2016

(65) Prior Publication Data

US 2017/0322838 A1    Nov. 9, 2017

(51) Int. Cl.
*G06F 11/00* (2006.01)
*G06F 11/07* (2006.01)
*G06F 9/46* (2006.01)

(52) U.S. Cl.
CPC .............. *G06F 11/079* (2013.01); *G06F 9/46* (2013.01); *G06F 11/0715* (2013.01); *G06F 11/0748* (2013.01); *G06F 11/0751* (2013.01); *G06F 11/0793* (2013.01)

(58) Field of Classification Search
CPC .................... G06F 11/0706; G06F 11/0742
See application file for complete search history.

(56) References Cited

U.S. PATENT DOCUMENTS

2015/0347220 A1*  12/2015  Hermany ............ G06F 11/0742
                                                                714/48
2018/0341521 A1*  11/2018  Crouse ................. G06F 9/4881

* cited by examiner

*Primary Examiner* — Christopher S McCarthy
(74) *Attorney, Agent, or Firm* — Esplin & Associats, PC (57) ABSTRACT

This disclosure relates to micro-batch processing of data. Micro-batch processing of data may be accomplished by receiving data conveying information pertaining to operation of client computing platforms. For a general time duration, the data may be added to a general queue. The data in the general queue may be processed in memory in accordance with a general job. For one or more specific time durations, the data may be added to one or more specific queues based on the client computing platform to which the data pertains. The data in the one or more specific queues may be processed in memory in accordance with one or more specific jobs. One or more errors in processing the data may be detected. The data corresponding to the detected error may be added to a skip queue.

20 Claims, 7 Drawing Sheets

SYSTEMS AND METHODS FOR MICRO-BATCH PROCESSING OF DATA

FIELD

This disclosure relates to systems and methods for micro-batch processing of data.

BACKGROUND

Data received from client computing platforms may be processed to extract information within the data. Processing data may include multiple operations on the data. Processing large amounts of data may be unwieldy and time consuming. If errors occur while processing large amounts of data, it may be difficult to locate the cause/source of the errors.

SUMMARY

This disclosure relates to micro-batch processing of data. Micro-batch processing of data may be accomplished by receiving data conveying information pertaining to operation of client computing platforms. For a general time duration, the data may be added to a general queue. The data in the general queue may be processed in memory in accordance with a general job. For one or more specific time durations, the data may be added to one or more specific queues based on the client computing platform to which the data pertains. The data in the one or more specific queues may be processed in memory in accordance with one or more specific jobs. One or more errors in processing the data may be detected. The data corresponding to the detected error may be added to a skip queue.

A system for micro-batch processing of data may include one or more of physical processors, and/or other components. The physical processor(s) may be configured by machine-readable instructions. Executing the machine-readable instructions may cause the physical processor(s) to facilitate micro-batch processing of data. The machine-readable instructions may include one or more computer program components. The computer program components may include one or more of a receive data component, a general queue component, a general job component, a specific queue component, a specific job component, an error component, and/or other computer program components.

The receive data component may be configured to receive one or more data conveying information pertaining to operation of client computing platforms. In some implementations, client computing platforms may include one or more of a camera, a mobile device, a desktop device, and/or other client computing platforms. One or more data may pertain to a client computing platform. For example, one or more data may include first data pertaining to a first client computing platform, and/or other data. In some implementations, information pertaining to operation of client computing platforms may include information pertaining to operation of one or more cameras communicating with the client computing platforms.

The general queue component may be configured to add one or more data to one or more general queues. One or more general queues may correspond to one or general time durations. For example, a general queue may correspond to a general time duration. Adding one or more data to a general queue may include adding one or more data to the general queue for the general time duration. In some implementations, the general queue component may be configured to add one or more data to one or more general queues based on the client computing platform to which the data pertains.

The general job component may be configured to process the data in one or more general queues in memory in accordance with one or more general jobs. One or more general queues may correspond to one or more general jobs. For example, a general queue may correspond to a general job. Processing the data in one or more general queues may include processing the data in the general queue in accordance with the general job. In some implementations, one or more general jobs may include one or more metadata operations on the data in the one or more general queues.

The specific queue component may be configured to add one or more data to one or more specific queues based on the client computing platform to which the data pertains. One or more specific queues may include one or more specific queues corresponding to one or more client computing platforms. One or more specific queues may correspond to one or more specific time durations. For example, one or more specific queues may include a first specific queue corresponding to the first client computing platform and/or other specific queues. The first specific queue may correspond to a first specific time duration. Adding one or more data to one or more specific queues may include adding the first data to the first specific queue for the first specific time duration.

The specific job component may be configured to process the data in one or more specific queues in memory in accordance with one or more specific jobs. One or more specific queues may correspond to one or more specific jobs. For example, the first specific queue may correspond to a first specific job. Processing the data in one or more specific queues may include processing the first data in accordance with the first specific job.

The error component may be configured to detect one or more errors in processing the data in accordance with one or more general jobs and/or one or more specific jobs. In some implementations, detecting one or more errors in processing the data in accordance with one or more general jobs and/or one or more specific jobs may include detecting one or more unexpected stops in processing the data in accordance with one or more general jobs and/or one or more specific jobs. In some implementations, detecting one or more errors in processing the data in accordance with one or more general jobs and/or one or more specific jobs may include detecting one or more unexpected values in one or more data.

Responsive to detection of one or more errors, the error component may be configured to add the data corresponding to the detected error to one or more skip queues. In some implementations, the error component may be configured to generate one or more notifications based on detection of one or more errors in processing the data in accordance with the general job and/or the one or more specific jobs. In some implementations, the error component may be configured to provide access to one or more skip queues. Access to one or more skip queues may be provided such that one or more data corresponding to one or more detected errors is assessable via one or more skip queue queries.

In some implementations, the error component may be configured to detect an unavailability of one or more general jobs and/or one or more specific jobs to process the data. Responsive to detection of the unavailability of one or more general jobs and/or one or more specific jobs to process the data, the error component may be configured to add the data corresponding to the detected unavailability to one or more retry queues.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
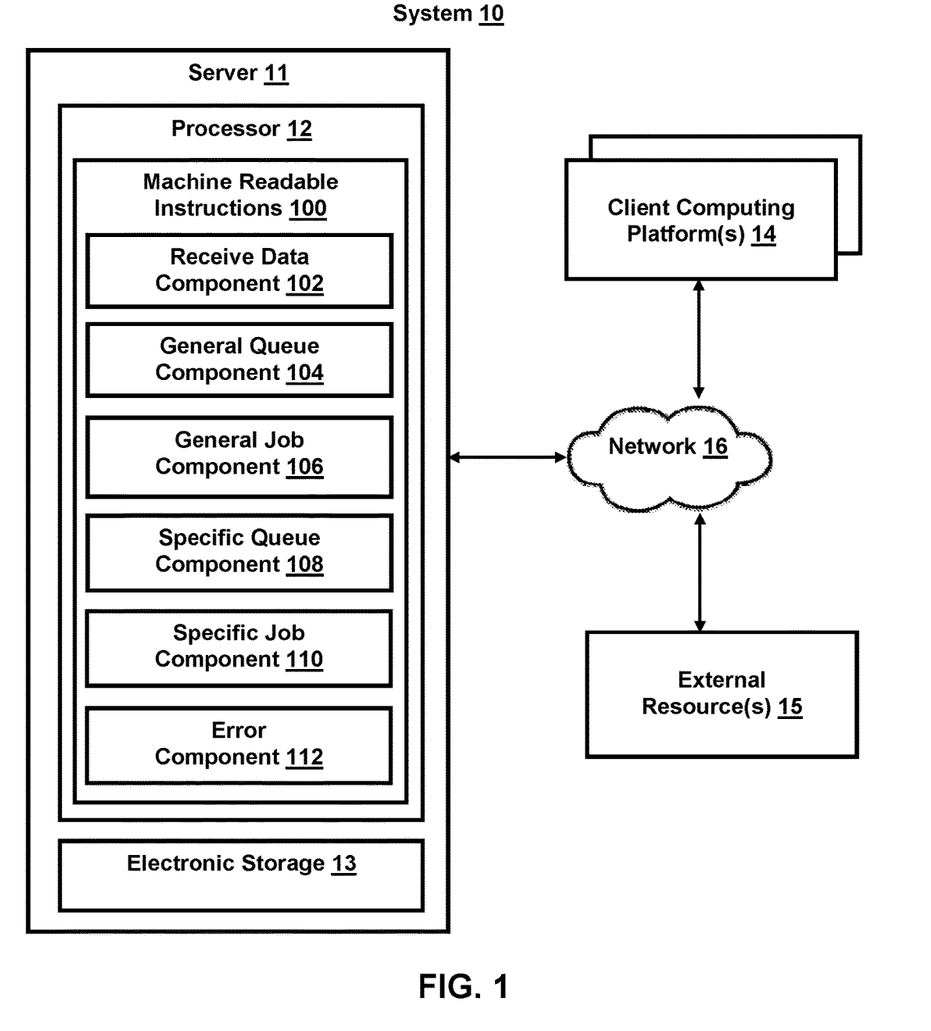
FIG. 1 illustrates a system for micro-batch processing of data.

FIG. 1 illustrates system 10 for micro-batch processing of data. Micro-batch processing of data may be accomplished by receiving data conveying information pertaining to operation of client computing platforms. For a general time duration, the data may be added to a general queue. The data in the general queue may be processed in memory in accordance with a general job. For one or more specific time durations, the data may be added to one or more specific queues based on the client computing platform to which the data pertains. The data in the one or more specific queues may be processed in memory in accordance with one or more specific jobs. One or more errors in processing the data may be detected. The data corresponding to the detected error may be added to a skip queue.

System 10 may include one or more server 11, processor 12, electronic storage 13, client computing platform(s) 14, external resource(s), and/or other components. Components of system 10 may be connected via one or more networks 16, for example communications networks.

Server 11 may include one or more of processor 12, electronic storage 13, and/or other components. Processor 12 may be configured to provide information processing capabilities in system 10. As such, processor 12 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 12 may be configured to execute one or more machine readable instructions 100 to facilitate micro-batch processing of data. Machine-readable instructions 100 may include one or more computer program components. Machine-readable instructions 100 may include one or more of receive data component 102, general queue component 104, general job component 106, specific queue component 108, specific job component 110, error component 112, and/or other computer program components.

Electronic storage 13 may include electronic storage media that electronically stores information. Electronic storage 13 may store software algorithms, information determined by processor 12, information received remotely, and/or other information that enables system 10 to function properly. For example, electronic storage 13 may store information relating to data conveying information pertaining to operation of client computing platforms, client computing platforms, general queues, general jobs, specific queues, specific jobs, skip queues, retry queues, and/or other information.

One or more features and/or functions of server 11 may be configured to facilitate micro-batch processing of data conveying information pertaining to operation of client computing platforms and/or other types of processing. It is noted that although the implementations disclosed herein are directed to micro-batch processing of data conveying information pertaining to operation of client computing platforms, one or more other implementations of system 10 and/or server 11 may be configured for other types of processing. By way of non-limiting example, types of data may include one or more of enterprise data, business intelligence data, data used to drive internal and/or commercial applications, and/or other types of data.

Receive data component 102 may be configured to receive one or more data conveying information pertaining to operation of client computing platform(s) 14. Receive data component 102 may receive one or more data conveying information pertaining to operation of client computing platform(s) 14 directly from one or more client computing platform(s) 14 and/or indirectly (e.g., via an intermediate computing device, via a data collection service, etc.). Computing devices/services sending data to server 11/receive data component 102 may be referred to as data sources. One or more data may pertain to a client computing platform. For example, one or more data may include first data pertaining to a first client computing platform, and/or other data.

Client computing platform(s) 14 may refer to computing devices that may generate and/or communicate information about their operation (e.g., modes of operation, activities of user interface, buttons pushed, features activated, etc.) to server 11 via a communications medium (e.g., network 16, etc.). In some implementations, client computing platform(s) 14 may include one or more of a camera, a mobile device, a desktop device, and/or other client computing platforms. One or more of a camera, a mobile device, a desktop device, and/or other client computing platforms may generate and store information about their operation in one or more data and/or communicate information about their operation in one or more data to server 11 via a communications medium (e.g., network 16, etc.). Data conveying information pertaining to operation of client computing platform(s) 14 may include different information and/or be stored in different formats based on client computing platform(s) 14. For example, data conveying information pertaining to operation of client computing platform(s) may include information specific to client computing platform(s) 14 and/or be stored in format(s) specific to client computing platform(s) 14 (e.g., different formats for logs indicating operation of client computing platform(s) 14, etc.).

Information pertaining to operation of client computing platform(s) 14 may include information pertaining operation of one or more hardware components and/or one or more software of client computing platform(s) 14. For example, information pertaining to operation of a camera may include information pertaining to operation of one or more hardware components of the camera (e.g., lens size, focus, capture speed, hardware based control of image/video capture, etc.) and/or one or more software (e.g., driver version, software based control of image/video capture, metadata, etc.) of the camera. Information pertaining to operation of a camera may be stored in a camera log. Information pertaining to operation of a mobile device or a desktop device may include information pertaining to operation of one or more hardware components of the mobile/desktop device (e.g., hardware specification, hardware usage, etc.) and/or one or more software (e.g., software version, software based manipulation of image/video, etc.) of the mobile/desktop device. Information pertaining to operation of a mobile device or a desktop device may be stored in a log of mobile/desktop device operation and/or a log of software operation.

In some implementations, client computing platform(s) 14 may communicate with one or more cameras. Information pertaining to operation of client computing platform(s) 14 may include information pertaining to operation of one or more cameras communicating with client computing platform(s). For example, information pertaining to operation of client computing platform(s) 14 may include information pertaining to operation (e.g., modes of operation, activities of user interface, buttons pushed, features activated, etc.) of the one or more cameras. In some implementations, information pertaining to operation of client computing platform(s) 14 may include metadata generated by and/or from the one or more cameras.

Figure 3:
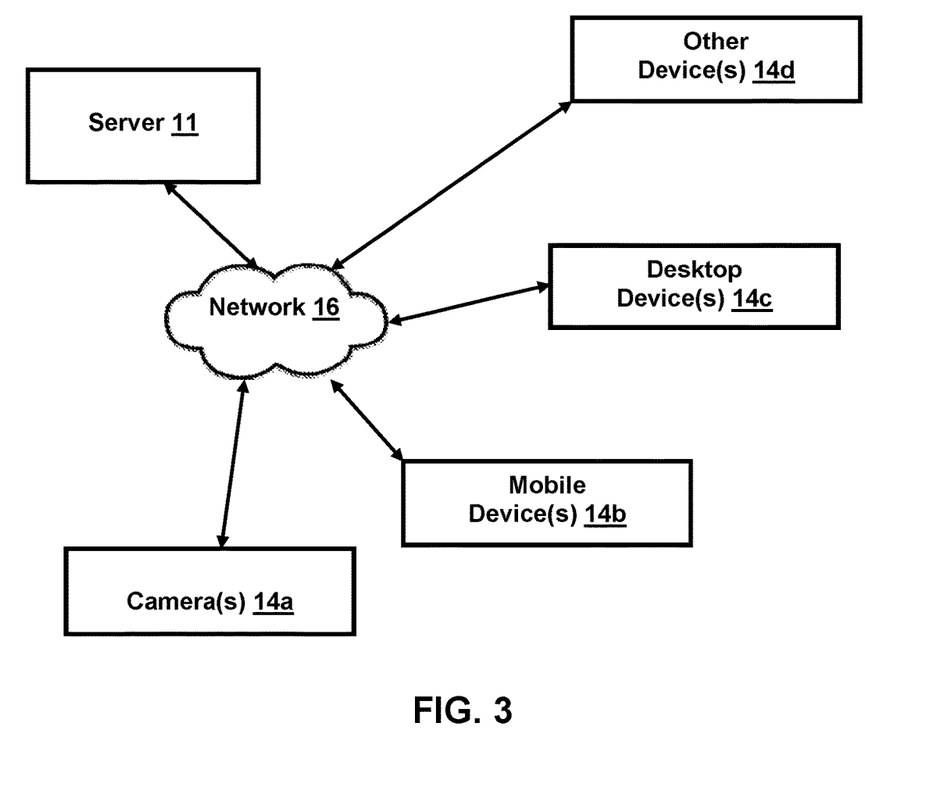
FIGS. 3-4 illustrate examples of client computing platforms connected to a network for micro-batch processing of data.
Figure 4:
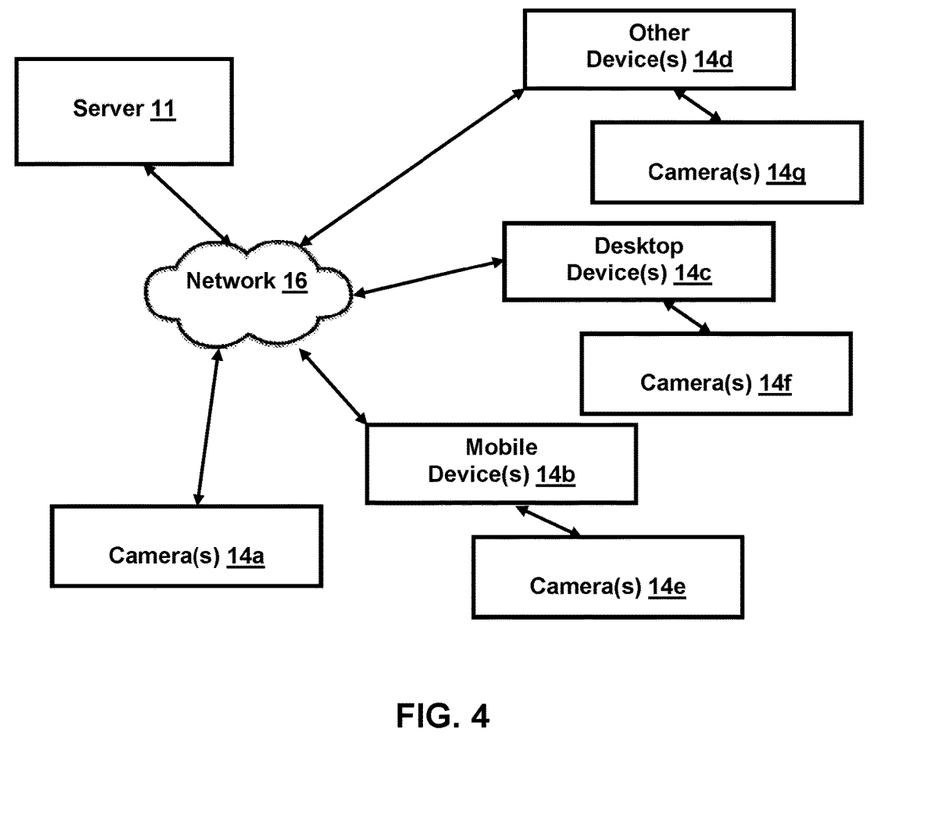

FIG. 3-4 illustrate examples of client computing platforms 14 connected to a network for micro-batch processing of data. In FIG. 3, server 11 may be connected to network 16. Client computing platforms 14 connected to network 16 may include camera(s) 14a, mobile device(s) 14b, desktop device(s) 14c, and other device(s) 14d. Camera(s) 14a, mobile device(s) 14b, desktop device(s) 14c, and/or other device(s) 14d may generate and/or communicate information about their operation to server 11 via network 16.

In FIG. 4, server 11 may be connected to network 16. Client computing platforms 14 connected to network 16 may include camera(s) 14a, mobile device(s) 14b communicating with camera(s) 14e, desktop device(s) 14c communicating with camera(s) 14f, and/or other device(s) 14d communicating with camera(s) 14g. Camera(s) 14a, mobile device(s) 14b, desktop device(s) 14c, and/or other device(s) 14d may generate and/or communicate information about their operation to server 11 via network 16. Mobile device(s) 14b, desktop device(s) 14c, and/or other device(s) 14d may generate and/or communicate information about operation of camera(s) 14e, 14f, 14g, respectively, to server 11 via network 16.

General queue component 104 may be configured to add one or more data to one or more general queues. One or more general queues may correspond to one or general time durations. For example, a general queue may correspond to a general time duration. Adding one or more data to a general queue may include adding one or more data to the general queue for the general time duration.

For example, the general time duration may include a few seconds (e.g., 2 seconds, etc.) or a few minutes (2 minutes, etc.) and general queue component 104 may batch a stream of data in the general queue by adding data to the general queue for the few seconds or the few minutes. Different general queues may correspond to the same general time duration or different general time durations. For example, a first general queue and a second general queue may correspond to a general time duration of 10 seconds, or a first general queue may correspond to a first general time duration of 5 seconds and a second general queue may correspond to a second general time duration of 60 seconds. Other durations for one or more general time durations are contemplated.

In some implementations, general queue component 104 may be configured to add one or more data to one or more general queues based on the client computing platform to which the data pertains. For example, data pertaining to certain client computing platforms may be added to one or more general queues. Data pertaining to certain client computing platforms may not be added to one or more general queues. For example, data pertaining to a certain computing platform may not contain information necessary to perform one or more operations corresponding to a general queue. General queue component 104 may filter such data so that they are not added to the general queue.

General job component 106 may be configured to process the data in one or more general queues in memory in accordance with one or more general jobs. One or more general queues may correspond to one or more general jobs. For example, a general queue may correspond to a general job. Processing the data in one or more general queues may include processing the data in the general queue in accordance with the general job.

A general job may refer to an operation performed on data regardless of client computing platform(s) 14 to which the data pertains. A general job may extract information from the data in one or more general queues, transform information from the data in one or more general queues, and/or add information to the data in one or more general queues. For example, a general job may include an IP-to-Geolocation operation, a serial number correlation operation, a user agent operation, a personally identifiable information anonymizing operation, a binary to human-readable format translation operation, a write to disk operation, or other general jobs. In some implementations, one or more general jobs may include one or more metadata operations on the data in one or more general queues.

An IP-to-Geolocation operation may obtain from the data the IP address(es) of the client computing platform(s) 14 from which data was sent and use the IP address(es) to determine the location(s) of the client computing platform(s) 14. A serial number correlation operation may obtain from the data the serial number(s) of the client computing platform(s) 14 and use the serial number(s) to determine hardware and/or software information regarding the client computing platform(s) 14. A user agent operation may obtain user agent information from the data and use the user agent information to determine hardware and/or software information regarding the client computing platform(s) 14. A personally identifiable information anonymizing operation may identify personally identifiable information (PII) in the data and change PII into non-identifying information). A binary to human-readable format translation operation may convert data in binary format (e.g., camera log, etc.) into a human-readable format (e.g., JSON, XML, etc.). A write to disk operation may write the data in memory to one or more data storage (e.g., HDFS storage, etc.). Other general jobs are contemplated.

General job component 106 may process the data in one or more general queues to include data lineage information with the data. Data lineage information may indicate a history of processes performed on the data. The history of processes performed on the data may include information relating to time, result, other processes, and/or other information relating to the data. For example, general job component 106 may process the data in one or more general queues to include information relating to (1) time of when one or more general jobs for the data began and/or ended, (2) whether one or more general jobs for the data was successful, (3) whether one or more general jobs for the data failed, (4) whether one or more general jobs for the data will be repeated, and/or other data lineage information. Data lineage information may be embedded into the data or be separately stored from the data (e.g., metadata passed along with the data, etc.).

Specific queue component 108 may be configured to add one or more data to one or more specific queues based on the client computing platform to which the data pertains. One or more specific queues may correspond to one or more client computing platforms. One or more specific queues may correspond to one or more specific time durations. For example, one or more specific queues may include a first specific queue corresponding to the first client computing platform and/or other specific queues. The first specific queue may correspond to a first specific time duration. Adding one or more data to one or more specific queues may include adding the first data to the first specific queue for the first specific time duration.

For example, the first specific queue time duration may include a few seconds (e.g., 2 seconds, etc.) or a few minutes (2 minutes, etc.) and specific queue component 108 may batch a stream of data in the first specific queue by adding data to the first specific queue for the few seconds or the few minutes. Different specific queues may correspond to the same specific time duration or different specific time durations. For example, a first specific queue and a second specific queue may correspond to a specific time duration of 10 seconds, or a first specific queue may correspond to a first specific time duration of 5 seconds and a second specific queue may correspond to a second specific time duration of 60 seconds. One or more general time durations and one or more specific time durations may be of the same or different durations. Other durations for one or more specific time durations are contemplated.

Specific job component 110 may be configured to process the data in one or more specific queues in memory in accordance with one or more specific jobs. One or more specific queues may correspond to one or more specific jobs. For example, the first specific queue may correspond to a first specific job. Processing the data in one or more specific queues may include processing the first data in the first queue in accordance with the first specific job.

A specific job may refer to an operation performed on data based on client computing platform(s) 14 to which the data pertains. A specific job may extract information from the data in one or more specific queues, transform information from the data in one or more specific queues, and/or add information to the data in one or more specific queues. For example, a specific job may include an IP-to-Geolocation operation specific to client computing platform(s) 14, a serial number correlation operation specific to client computing platform(s) 14, a user agent operation specific to client computing platform(s) 14, a personally identifiable information anonymizing operation specific to client computing platform(s) 14, a binary to human-readable format translation operation specific to client computing platform(s) 14, a write to disk operation specific to client computing platform(s) 14, or other specific jobs. In some implementations, one or more specific jobs may include one or more metadata operations on the data in one or more specific queues.

A specific job may include a data conversion operation specific to client computing platform(s) 14. A data conversion operation specific to client computing platform(s) 14 may convert data (containing different information based on client computing platform(s) 14 and/or stored in different formats based on client computing platform(s) 14) into a general binary format, which may be converted into a human-readable format via a general binary to human-readable format translation operation. Other specific jobs are contemplated.

Specific job component 110 may process the data in one or more specific queues to include data lineage information with the data. Data lineage information may indicate a history of processes performed on the data. The history of processes performed on the data may include information relating to time, result, other processes, and/or other information relating to the data. For example, specific job component 110 may process the data in one or more specific queues to include information relating to (1) time of when one or more specific jobs for the data began and/or ended, (2) whether one or more specific jobs for the data was successful, (3) whether one or more specific jobs for the data failed, (4) whether one or more specific jobs for the data will be repeated, and/or other data lineage information. Data lineage information may be embedded into the data or be separately stored from the data (e.g., metadata passed along with the data, etc.).

Error component 112 may be configured to detect one or more errors in processing the data in accordance with one or more general jobs and/or one or more specific jobs. One or more general jobs and/or one or more specific jobs may indicate an error in processing the data to error component 112. For example, one or more general jobs and/or one or more specific jobs may indicate an error in processing the data via one or more flags and error component 112 may be configured to detect one or more flags. Other methods of detecting errors are contemplated.

In some implementations, detecting one or more errors in processing the data in accordance with one or more general jobs and/or one or more specific jobs may include detecting one or more unexpected stops in processing the data in accordance with one or more general jobs and/or one or more specific jobs. For example, error component 112 may detect that one or more general jobs and/or one or more specific jobs stopped processing the data before completing their respective jobs.

In some implementations, detecting one or more errors in processing the data in accordance with one or more general jobs and/or one or more specific jobs may include detecting one or more unexpected values in one or more data. For example, error component 112 may detect a blank or obsolete value in the data. Error component 112 may detect an inappropriate/inconsistent value in the data. For example, error component 112 may detect a character value when a numeric value is expected (or vice versa) and/or inconsistencies between related values in the data. In some implementations, detecting one or more errors in processing the data in accordance with one or more general jobs and/or one or more specific jobs may include detecting ranges of error in one or more unexpected values in one or more data.

Responsive to detection of one or more errors, error component 112 may be configured to add the data corresponding to the detected error to one or more skip queues. One or more skip queues may correspond to one or more general jobs and/or one or more specific jobs. For example, in response to detecting one or more errors in accordance with a general job, error component 112 may add the data corresponding to the detected error to a common skip queue and/or a skip que corresponding to the general job. In response to detecting one or more errors in accordance with a specific job, error component 112 may add the data corresponding to the detected error to a common skip queue and/or a skip que corresponding to the specific job. Data corresponding to the detected error may include pre-processed data, post-processed data, information relating to the error, and/or other information. In some implementations, adding the data corresponding to the detected error to one or more skip queues may be based on the range of error.

In some implementations, error component 112 may be configured to generate one or more notifications based on detection of one or more errors in processing the data in accordance with one or more generals job and/or one or more specific jobs. The notification may indicate that one or more generals job and/or one or more specific jobs have failed to processed the data/some part(s) of the data. In some implementations, a notification may include an electronic message that is transferred to one or more users. In some implementations, a notification may include a message that is displayed on a user interface.

In some implementations, error component 112 may be configured to provide access to one or more skip queues. Access to one or more skip queues may be provided such that one or more data corresponding to one or more detected errors is assessable via one or more skip queue queries. For example, a skip queue query may provide access to one or more data corresponding to one or more detected errors added to a common skip queue. A skip queue query may provide access to one or more data corresponding to one or more detected errors added to one or more general skip queues. A skip queue query may provide access to one or more data corresponding to one or more detected errors added to one or more general skip queues. A skip queue query may provide access to one or more data corresponding to one or more detected error added to one or more different types of skip queues.

In some implementations, error component 112 may be configured to detect an unavailability of one or more general jobs and/or one or more specific jobs to process the data. Responsive to detection of the unavailability of one or more general jobs and/or one or more specific jobs to process the data, error component 112 may be configured to add the data corresponding to the detected unavailability to one or more retry queues. One or more retry queues may correspond to one or more general jobs and/or one or more specific jobs. For example, in response to detecting an unavailability of a general job, error component 112 may add the data corresponding to the detected unavailability to a common retry queue and/or a retry que corresponding to the general job. In response to detecting an unavailability of a specific job, error component 112 may add the data corresponding to the detected unavailability to a common retry queue and/or a retry que corresponding to the specific job. Data added to one or more retry queues may be processed by the corresponding general job/specific job after a time duration and/or after the availability of the general job/specific job has been detected.

Figure 5:
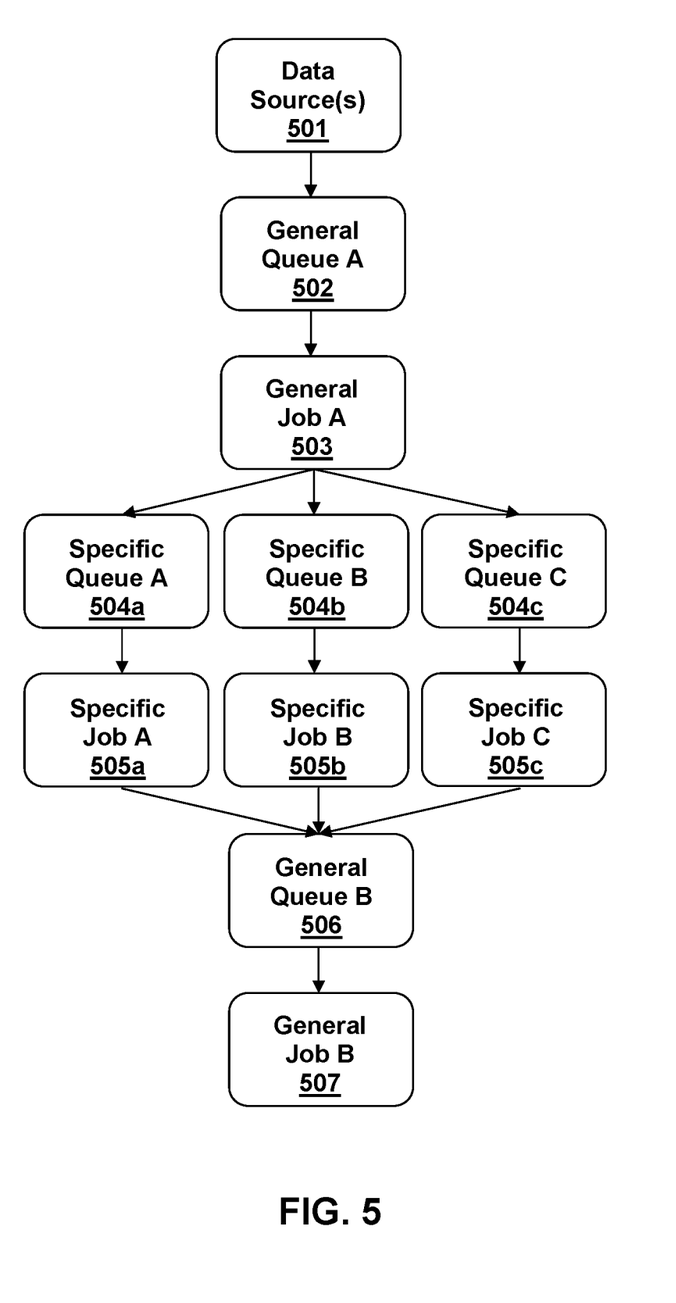
FIGS. 5-7. illustrate exemplary scenarios of micro-batch processing of data.
Figure 6:
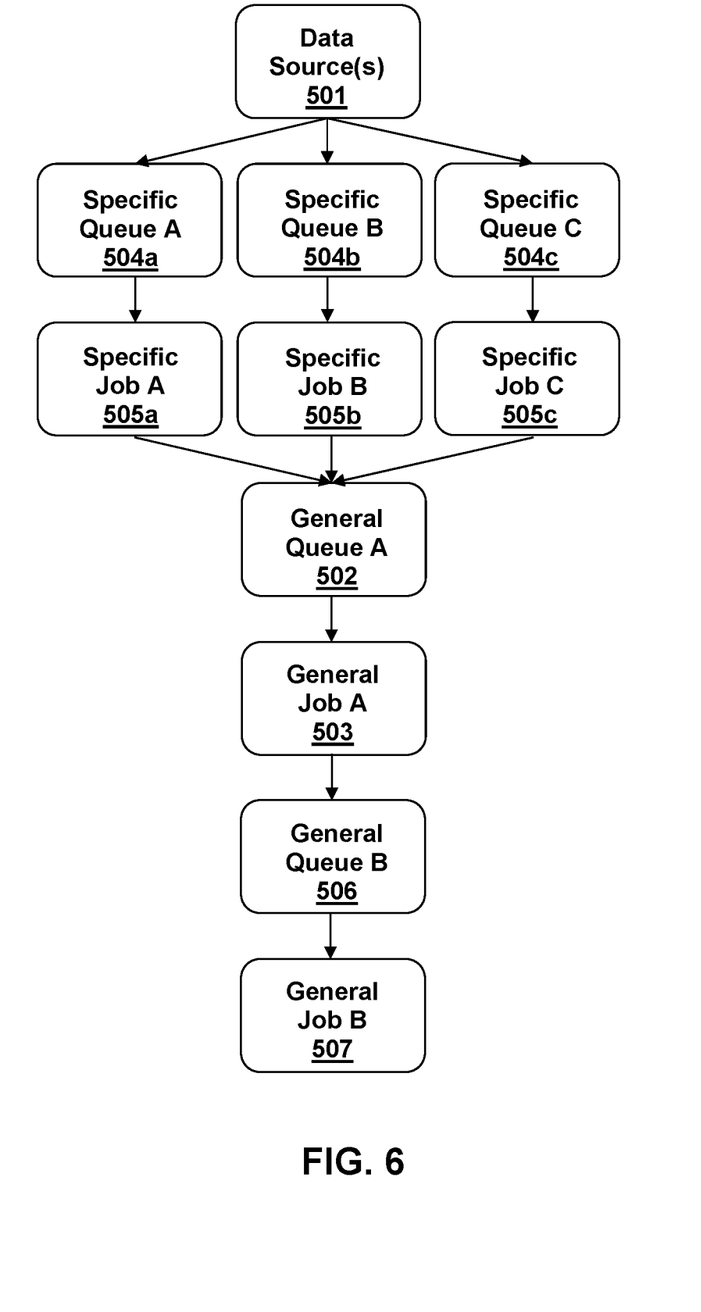
Figure 7:
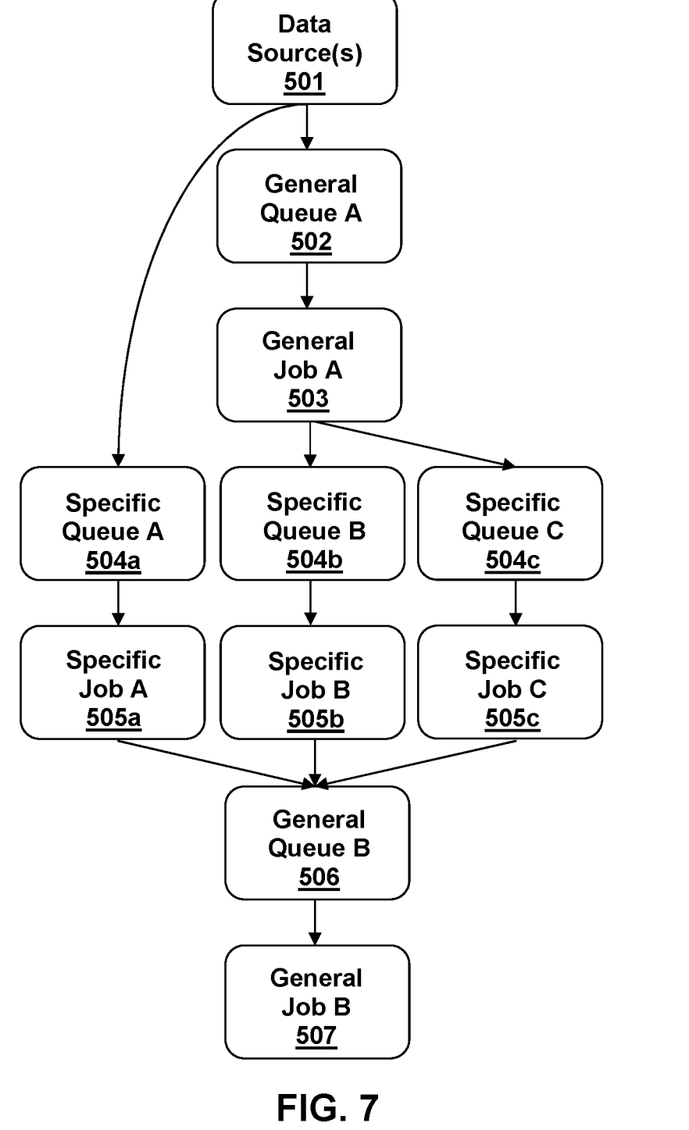

FIGS. 5-7 illustrate exemplary scenarios of micro-batch processing of data. Other scenarios of micro-batch processing of data are contemplated. In FIG. 5, data source(s) 501 may send data conveying information pertaining to operation of client computing platforms. For a general time duration (e.g., a common general time duration or a general time duration corresponding to general queue A 502), the data may be added to general queue A 502. After the general time duration, the data added to general queue A 502 may be processed in accordance with general job A 503. The processed data may be added to specific queue A 504a, specific queue B 504b, and/or specific queue C 504c for one or more specific time durations (e.g., a common specific time duration or specific time durations corresponding to specific queue A 504a, specific queue B 504b, specific queue C 504c) based on the client computing platform to which the data pertains. After the one or more specific time durations, the data added to specific queue A 504a, specific queue B 504b, and/or specific queue C 504c may be processed in accordance with specific job A 505a, specific job B 505b, and/or specific job C 505c, respectively. The processed data may be added to general queue B 506 for a general time duration (e.g., a common general time duration or a general time duration corresponding to general queue B 506). After the general time duration, the data added to general queue B 506 may be processed in accordance with general job B 507. Processing of data may contain other queues and/or jobs.

In FIG. 6, data source(s) 501 may send data conveying information pertaining to operation of client computing platforms. For one or more specific time durations (e.g., a common specific time duration or specific time durations corresponding to specific queue A 504a, specific queue B 504b, specific queue C 504c), the data may be added to specific queue A 504a, specific queue B 504b, and/or specific queue C 504c based on the client computing platform to which the data pertains. After the one or more specific time durations, the data added to specific queue A 504a, specific queue B 504b, and/or specific queue C 504c may be processed in accordance with specific job A 505a, specific job B 505b, and/or specific job C 505c, respectively. The processed data may be added to general queue A 502 for a general time duration (e.g., a common general time duration or a general time duration corresponding to general queue A 502). After the general time duration, the data added to general queue A 502 may be processed in accordance with general job A 503. The processed data may be added to general queue B 506 for a general time duration (e.g., a common general time duration or a general time duration corresponding to general queue B 506). After the general time duration, the data added to general queue B 506 may be processed in accordance with general job B 507. Processing of data may contain other queues and/or jobs.

In FIG. 7, data source(s) 501 may send data conveying information pertaining to operation of client computing platforms. For a general time duration (e.g., a common general time duration or a general time duration corresponding to general queue A 502), the data may be added to general queue A 502 based on the client computing platform to which the data pertains. For a specific time duration (e.g., a common specific time duration or specific time durations corresponding to specific queue A 504a), the data may be added to specific queue A 504a based on the client computing platform to which the data pertains. After the general time duration, the data added to general queue A 502 may be processed in accordance with general job A 503. After the specific time duration, the data added to specific queue A 504a may be processed in accordance with specific job A 505a. The data processed in accordance with general job A 503 may be added to specific queue B 504b and/or specific queue C 504c for one or more specific time duration (e.g., a common specific time duration or specific time durations corresponding to specific queue B 504b and/or specific queue C 504C) and the data may be processed in accordance with specific job B 505b and/or specific job C 505C, respectively. The processed data may be added to general queue B 506 for a general time duration (e.g., a common general time duration or a general time duration corresponding to general queue B 506). After the general time duration, the data added to general queue B 506 may be processed in accordance with general job B 507. Processing of data may contain other queues and/or jobs.

Although server 11, client computing platform(s) 14, and external resource(s) 15 are shown to be connected to network 16 in FIG. 1, any communication medium/link may be used to facilitate interaction between any components of system 10. One or more components of system 10 may communicate with each other through hard-wired communication, wireless communication, or both. One or more components of system 10 may communicate with each other through multiple networks and/or multiple wired/wireless communications. By way of non-limiting example, wireless communication may include one or more of radio communication, Bluetooth communication, Wi-Fi communication, cellular communication, infrared communication, or other wireless communication. Other types of communications are contemplated by the present disclosure.

In some implementations, network 16 may include the Internet and/or may employ other communications technologies and/or protocols. By way of non-limiting example, network 16 may employ communication technologies including one or more of Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. By way of non-limiting example, network 16 may employ networking protocols including one or more of multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged over network 16 may be represented using formats including one or more of hypertext markup language (HTML), extensible markup language (XML), and/or other formats. One or more exchanges of information between components of system 10 may be encrypted using encryption technologies including one or more of secure sockets layer (SSL), transport layer security (TLS), virtual private networks (VPNs), Internet Protocol security (IPsec), and/or other encryption technologies. In some implementations, one or more components of system 10 may use custom and/or dedicated data communications technologies instead of, or in addition to, the ones described above. It will be appreciated that this is not intended to be limiting and that the components of system 10 may be operatively linked via some other communication media.

External resource(s) 15 may include sources of information, hosts, and/or other entities outside of system 10, external entities participating with system 10, and/or other resources. In some implementations, some or all of the functionality attributed herein to system 10 may be provided by external resource(s) 15.

Although processor 12 is shown in FIG. 1 as a single entity, this is for illustrative purposes only. In some implementations, processor 12 may comprise a plurality of processing units. These processing units may be physically located within the same device, or processor 12 may represent processing functionality of a plurality of devices operating in coordination. Processor 12 may be configured to execute one or more components by software; hardware; firmware; some combination of software, hardware, and/or firmware; and/or other mechanisms for configuring processing capabilities on processor 12.

It should be appreciated that although computer components are illustrated in FIG. 1 as being co-located within a single processing unit, in implementations in which processor 12 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, 110, and/or 112 may be eliminated, and some or all of its functionality may be provided by other computer program components. As another example, processor 12 may be configured to execute one or more additional computer program components that may perform some or all of the functionality attributed to one or more of computer program components 102, 104, 106, 108, 110, and/or 112 described herein.

The electronic storage media of electronic storage 13 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 13 may be a separate component within system 10, or electronic storage 13 may be provided integrally with one or more other components of system 10 (e.g., processor 12). Although electronic storage 13 is shown in FIG. 1 as a single entity, this is for illustrative purposes only. In some implementations, electronic storage 13 may comprise a plurality of storage units. These storage units may be physically located within the same device, or electronic storage 13 may represent storage functionality of a plurality of devices operating in coordination.

One or more features and/or functions attributed to server 11 may be provided at a client-end application that may be installed on client computing platform(s) 14, and/or vice versa. In some implementations, one or more features and/or functions attributed to server 11 may be configured as a cloud-based application that a user may access via client computing platform(s) 14. In some implementations, an application providing one or more features and/or functions attributed herein to server 11 may be configured to be part client-end and part cloud based. Further, it is noted that the one or more client computing platforms, servers, and/or other machines executing a client-based application and/or a cloud-based application may include one or more of one or more processors, electronic storage configured to store and/or execute program code corresponding to the processes described herein, and/or other components.

By way of non-limiting example, individual ones of one or more computing platforms 122 may include machine-readable instructions comprising the same or similar components as machine-readable instructions 106 of server 102.

Computing platforms 122 may be configured to execute locally the same or similar components of machine-readable instructions 106

Figure 2:
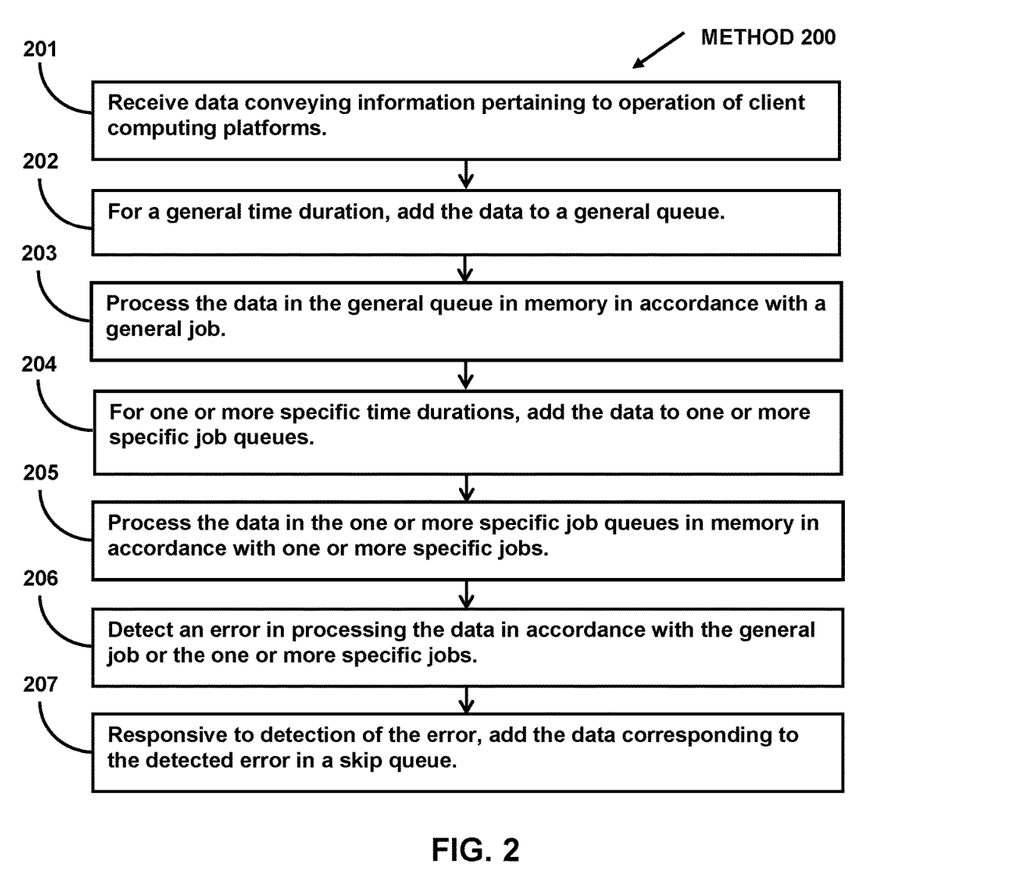
FIG. 2 illustrates a method for micro-batch processing of data.

FIG. 2 illustrates method 200 for micro-batch processing of data. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, data conveying information pertaining to operation of client computing platforms may be received. In some implementations, operation 201 may be performed by a processor component the same as or similar to receive data component 102 (shown in FIG. 1 and described herein).

At operation 202, the data may be added to a general queue for a general time duration. In some implementations, operation 202 may be performed by a processor component the same as or similar to general queue component 104 (shown in FIG. 1 and described herein).

At operation 203, the data in the general queue may be processed in memory in accordance with a general job. In some implementations, operation 203 may be performed by a processor component the same as or similar to general job component 106 (shown in FIG. 1 and described herein).

At operation 204, the data may be added to one or more specific job queues for one or more specific time durations. In some implementations, operation 204 may be performed by a processor component the same as or similar to specific queue component 108 (shown in FIG. 1 and described herein).

At operation 205, the data in the one or more specific job queues may be processed in memory in accordance with one or more specific jobs. In some implementations, operation 205 may be performed by a processor component the same as or similar to specific job component 110 (shown in FIG. 1 and described herein).

At operation 206, an error in processing the data in accordance with the general job or the one or more specific jobs may be detected. In some implementations, operation 206 may be performed by a processor component the same as or similar to error component 112 (shown in FIG. 1 and described herein).

At operation 207, responsive to detection of the error, the data corresponding to the detected error may be added to a skip queue. In some implementations, operation 207 may be performed by a processor component the same as or similar to error component 112 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for micro-batch processing of data, the system comprising:
  one or more physical processors configured by machine readable instruction to:
    receive the data conveying information pertaining to operation of client computing platforms;
    for a general time duration, add the data to a general queue;
    process the data in the general queue in memory in accordance with a general job;
    for one or more specific time durations, add the data to one or more specific queues based on the client computing platform to which the data pertains, the data including first data pertaining to a first client computing platform and the one or more specific queues including a first specific queue corresponding to the first client computing platform, wherein adding the data to the one or more specific queues includes adding the first data to the first specific queue for a first specific time duration;
    process the data in the one or more specific queues in memory in accordance with one or more specific jobs, wherein processing the data in the one or more specific queues includes processing the first data in accordance with a first specific job;
    detect an error in processing the data in accordance with the general job or the one or more specific jobs; and
    responsive to detection of the error, add the data corresponding to the detected error to a skip queue.

2. The system of claim 1, wherein the client computing platforms include one or more of a camera, a mobile device, and/or a desktop device.

3. The system of claim 1, wherein the information pertaining to operation of client computing platforms includes information pertaining to operation of one or more cameras communicating with the client computing platforms.

4. The system of claim 1, wherein the one or more physical processors are further configured by machine readable instruction to provide access to the skip queue such that the data corresponding to the detected error is assessable via a skip queue query.

5. The system of claim 1, wherein the one or more physical processors are further configured by machine readable instructions to generate a notification based on the detection of the error in processing the data in accordance with the general job or the one or more specific jobs.

6. The system of claim 1, wherein detecting the error in processing the data in accordance with the general job or the one or more specific jobs includes detecting an unexpected stop in processing the data in accordance with the general job or the one or more specific jobs.

7. The system of claim 1, wherein detecting the error in processing the data in accordance with the general job or the one or more specific jobs includes detecting an unexpected value in the data.

8. The system of claim 1, wherein the general job includes a metadata operation on the data in the general queue.

9. The system of claim 1, wherein the one or more physical processors are further configured by machine readable instructions to:
  detect an unavailability of the general job or the one or more specific jobs to process the data; and
  responsive to detection of the unavailability of the general job or the one or more specific jobs to process the data, add the data corresponding to the detected unavailability to a retry queue.

10. A method for micro-batch processing of data, the method comprising:
  receiving the data conveying information pertaining to operation of client computing platforms;
  for a general time duration, adding the data to a general queue;
  processing the data in the general queue in memory in accordance with a general job;
  for one or more specific time durations, adding the data to one or more specific queues based on the client computing platform to which the data pertains, the data including first data pertaining to a first client computing platform and the one or more specific queues including a first specific queue corresponding to the first client computing platform, wherein adding the data to the one or more specific queues includes adding the first data to the first specific queue for a first specific time duration;
  processing the data in the one or more specific queues in memory in accordance with one or more specific jobs, wherein processing the data in the one or more specific queues includes processing the first data in accordance with a first specific job;
  detecting an error in processing the data in accordance with the general job or the one or more specific jobs; and
  responsive to detection of the error, adding the data corresponding to the detected error to a skip queue.

11. The method of claim 10, wherein the client computing platforms include one or more of a camera, a mobile device, and/or a desktop device.

12. The method of claim 10, wherein the information pertaining to operation of client computing platforms includes information pertaining to operation of one or more cameras communicating with the client computing platforms.

13. The method of claim 10, further comprising providing access to the skip queue such that the data corresponding to the detected error is assessable via a skip queue query.

14. The method of claim 10, further comprising generating a notification based on the detection of the error in processing the data in accordance with the general job or the one or more specific jobs.

15. The method of claim 10, wherein detecting the error in processing the data in accordance with the general job or the one or more specific jobs includes detecting an unexpected stop in processing the data in accordance with the general job or the one or more specific jobs.

16. The method of claim 10, wherein detecting the error in processing the data in accordance with the general job or the one or more specific jobs includes detecting an unexpected value in the data.

17. The method of claim 10, wherein the general job includes a metadata operation on the data.

18. The method of claim 10, further comprising:
  detecting an unavailability of the general job or the one or more specific jobs to process the data; and
  responsive to detection of the unavailability of the general job or the one or more specific jobs to process the data, adding the data corresponding to the detected unavailability to a retry queue.

19. A system for micro-batch processing, the system comprising:
  one or more physical processors configured by machine readable instruction to:
    receive data conveying information pertaining to operation of client computing platforms
    for a general time duration, add the data to a general queue;
    process the data in the general queue in memory in accordance with a general job;
    for one or more specific time durations, add the data to one or more specific queues based on the client computing platform to which the data pertains, the data including first data pertaining to a first client computing platform and the one or more specific queues including a first specific queue corresponding to the first client computing platform, wherein adding the data to the one or more specific queues includes adding the first data to the first specific queue for a first specific time duration;
    process the data in the one or more specific queues in memory in accordance with one or more specific jobs, wherein processing the data in the one or more specific queues includes processing the first data in accordance with a first specific job;
    detect an error in processing the data in accordance with the general job or the one or more specific jobs;
    responsive to detection of the error, add the data corresponding to the detected error to a skip queue;
    generate a notification based on the detection of the error in processing the data in accordance with the general job or the one or more specific jobs;
    provide access to the skip queue such that the data corresponding to the detected error is assessable via a skip queue query
    detect an unavailability of the general job or the one or more specific jobs to process the data; and
    responsive to detection of the unavailability of the general job or the one or more specific jobs to process the data, add the data corresponding to the detected unavailability to a retry queue.

20. The system of claim 19, wherein the general job includes a metadata operation on the data in the general queue.

* * * * *